United States Patent Office 3,405,980
Patented Oct. 15, 1968

3,405,980
ROTARY SWIVEL
George Stonebraker, Adena, Ohio, assignor to Austin Powder Company, Cleveland, Ohio, a corporation of Ohio
Filed Oct. 5, 1965, Ser. No. 493,212
11 Claims. (Cl. 308—207)

ABSTRACT OF THE DISCLOSURE

A rotary swivel having a pair of generally cylindrical sleeve-like members including an inner member and an outer member disposed for rotational movement with respect to the inner member and a bearing assembly disposed between said members. A locking nut threadably connected to said inner member for pre-loading said bearing assembly and a locking ring disposed in sealing relation with said inner member and in engaged supporting relation with said bearing assembly. An adapter plate detachably mounted for rotary movement with said outer member for holding the locking ring in supporting relation with said bearing assembly.

---

This invention relates in general to a rotary swivel and more particularly to a novel rotary swivel of the type which may be employed in connection with the rotary drilling of, for instance, oil, gas or water wells.

Rotary swivels for use with rotary drills are well known in the art. However, most of such rotary swivel mechanisms are unduly complex, or are so constructed as to be impossible or relatively difficult to disassemble for replacement or adjustment of parts, such as the bearing structure of the swivel. Therefore, such prior art swivel mechanisms have not been entirely satisfactory.

Accordingly, an object of this invention is to provide a novel rotary swivel arrangement.

Another object of the invention is to provide a rotary swivel for use with a rotary drill, and including a relatively stationary section and a rotatable section adapted for rotary movement with respect to the stationary section, and having bearing means disposed between said sections for facilitating the relative rotary movement between the sections, and wherein means is provided for expeditiously replacing all or part of the bearing means in the rotary swivel in the event that the latter becomes necessary or desirable.

Another object of the invention is to provide a novel rotary swivel of the above type having means for adjusting the bearing means to maintain the stationary and rotary sections of the swivel in substantially perfect alignment, and preventing lateral movement of such parts, thus minimizing wear and providing a long service life for the rotary swivel.

Another object of the invention is to provide a rotary swivel of the above discussed type including means for expeditiously providing a sealing relationship between the stationary and rotary sections of the swivel, and wherein such sealing means includes means readily accessible for adjusting the sealing means to maintain the sealing relationship over long periods of use of the rotary swivel mechanism.

Other objects and advantages of the invention will be apparent from the following description taken in conjunction with the accompanying drawings wherein.

Figure 1:
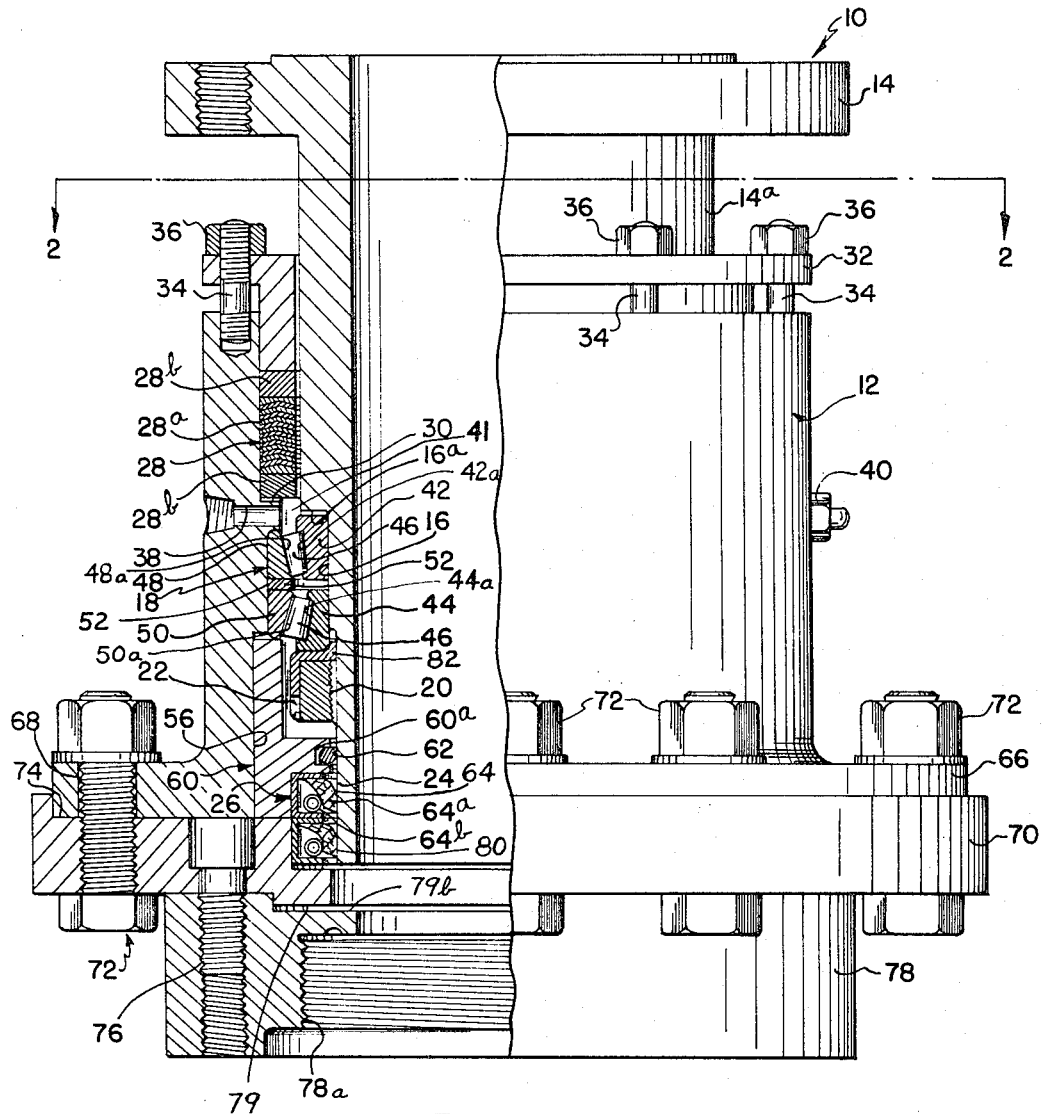
FIG. 1 is a partially sectioned elevational view of the rotary swivel mechanism of the invention.
Figure 2:
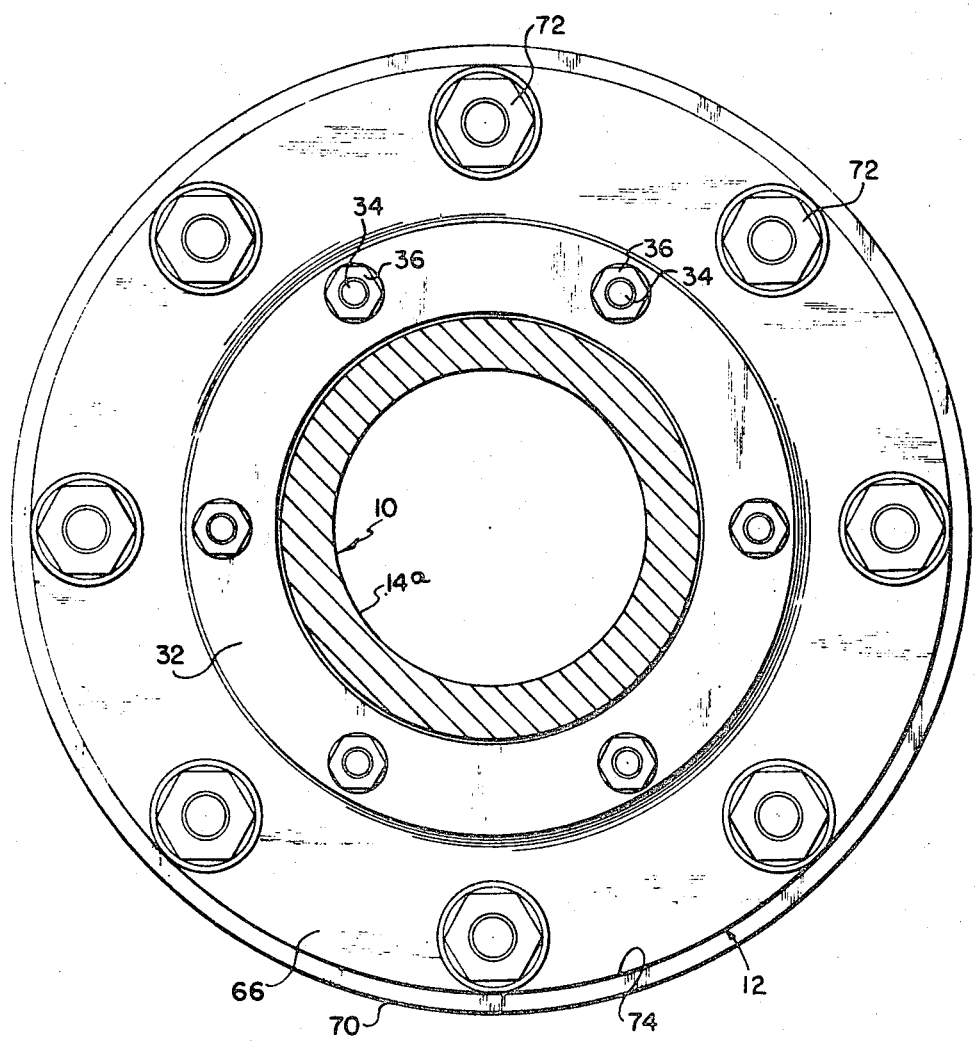
FIG. 2 is a sectional view taken generally along the plane of line 2—2 of FIG. 1, looking in the direction of the arrows.

Referring again to the drawings, the rotary swivel mechanism may comprise an inner or relatively stationary section 10 and an outer or relatively rotatable section 12 which in the embodiment illustrated in shown as substantially encompassing the stationary section 10.

Stationary section 10 may comprise an upper flange portion 14 and depending hollow or sleeve-like cylindrical portion 14a extending into the interior of the hollow rotary section 12. The exterior of the cylindrical portion 14a of stationary section 10 may be recessed as at 16, which defines a shoulder 16a against which a bearing assembly 18 may abut. Spaced downwardly from the shoulder 16a is a circumferentially extending threaded portion 20, on which is threaded an adjusting nut 22, and spaced downwardly from the threaded portion 20, is a generally smooth cylindrical surface portion 24, which is adapted for engagement by the sealing means 26 for a purpose to be hereinafter described. Portion 24 of the stationary swivel section 10 is of such size or diameter that the nut 22 can be readily slipped over portion 24, and into threaded engagement with threaded portion 20, during assembly of the rotary swivel.

Disposed intermediate the stationary and the rotary sections 10 and 12, adjacent the upper end of the rotary section 12, is a stuffing box 28 which may include the chevron packing 28a disposed between preferably bronze packing rings 28b. The lower of rings 28b is adapted to coact with abutment means such as shoulder 30 on the interior of the rotary section 12, for supporting the stuffing box in predetermined position in the rotary swivel, and there may be provided a gland member 32 which is adapted to coact with the upper of the packing rings 28b, intermediate the interior and exterior surfaces of respectively the rotary section 12 and the stationary section 10, for squeezing the packing 28a between the packing rings 28b.

In this connection, stud means 34 may be threaded into circumferentially spaced holes in the upper end surface of the rotary section 12 and extend through corresponding openings in the flange on the gland 32, to receive threaded nuts 36, for selectively urging the gland into compressing relationship with respect to the stuffing box.

Extending through the side wall of the rotary swivel section 12 there may be provided one or more access openings 38 each of which may be provided with a conventional fitting 40 of preferably the overflow type for inserting lubricant into the bearing chamber 41.

Bearing 18 may comprise cupped-like, vertically spaced upper and lower inner raceways 42, 44. The upper race 42 has an upwardly and outwardly tapering roller surface 42a thereon while the lower race 44 has a downwardly and outwardly tapering roller surface 44a. Tapered vertically spaced rollers 46 are provided coacting with the tapered surfaces on the upper and lower inner raceways. Disposed in confronting relation to the rollers 46 are upper and lower outer raceways 48, 50, with the upper outer raceway 48 having an upwardly and outwardly diverging tapered surface 48a while the lower raceway 50 has an outwardly and downwardly diverging roller surface 50a, coacting with the respective of the rollers 46. Outer raceways 48, 50 are not cupped, like inner raceways 42, 44 and the tapered surfaces 48a and 50a are preferably generally uninterrupted as shown. A spacer ring 52 may be provided in engaged relation between the upper and lower outer raceways 48 and 50. It will be noted that the rotary swivel section 12 is recessed to receive the outer raceways 48 and 50 and is further recessed as at 56 for receiving therein an outer race locking ring member 60. The upper end of the locking ring member 60 is adapted to engage the lower outer race 50, and hold the outer races 48 and 50 in predetermined position in the swivel assembly.

Locking ring 60 is preferably provided with a radially inwardly extending circumferential flange 60a which may be provided with a recess having an O-ring 62 therein, for providing a sealing relationship between the locking ring 60 and the confronting portion 24 of the relatively stationary swivel section 10.

Locking ring 60 may also be circumferentially recessed adjacent its lower end for receiving therein sealing unit 64 of aforementioned sealing means 26, which may include a wiper ring 64a and coacting spring means 64b.

The lower end of the rotary section 12 of the swivel may be provided with a lateral flange 66 which may have circumferentially spaced openings 68 drilled therethrough. Such flange is adapted for coupling a centrally apertured adapter plate 70 to the rotary swivel section 12 and as by means of the threaded bolts and nut assemblies 72 extending through the aligned openings in the adapter plate 70 and in the flange 66 of the rotary section 12. Adapter plate 70 has a circumferential recess 74 therein for receiving in seating relationship the flange 66 of the rotary section 12.

Adapter plate 70 is adapted for coupling, as by means of cap screws 76 which are recessed into the adapter plate, to the collar 78 which is adapted to be coupled to the drill stem and as by means of the threaded section 78a. Adapter plate 70 may have a depending embossment 79 thereon adapted to be received in upwardly facing recess 79b in drill collar 78. Accordingly, upon rotary movement of the rotary section 12 of the swivel, adapter plate 70 rotates with the rotary section 12, and the drill collar 78 will also rotate with the rotary swivel section 12 and with respect to the stationary swivel section 10. Sealing unit 80 may be provided in recessed relation in adapter plate 70, and coacting in sealing relation with portion 24 of swivel section 10. Unit 80 may be of a generally similar type as that of unit 64.

It will be seen that the mechanism is such that the bearing assembly 18 can be readily replaced if such necessity arises, by merely removing the fastener assemblies 72 and dropping the adapter plate 70 and drill collar 78 from the rotary section 12, which enables convenient removal of the locking ring 60, and thus accessibility to the adjusting nut 22. Removal of the adjusting nut 22, of course, will permit removal of the bearing assembly for convenient replacement or repair. It will also be seen that such an arrangement provides for convenient adjustment of the adjusting nut 22 to enable selective pre-loading of the bearing assembly 18 while the latter is assembled with swivel sections 10 and 12, and insuring perfect alignment between the stationary swivel section 10 and the rotary swivel section 12, by tightening up or loosening up on the adjusting nut 22 and therefore providing for long service life for the swivel assembly. Bearing assembly 18 is preferably adjusted or pre-loaded by nut 22 before the weight of the rotary section 12 is applied to the bearing assembly. A locking washer 82 may be provided for coaction with nut 22 for positively holding the nut in selected position with respect to stationary section 10 and bearing assembly 18.

If it is desired to adjust the compression of the stuffing box 28, this can be readily accomplished by tightening up on the nuts 36 coacting with the studs 34, thus insuring a good continuing sealing relationship between the rotatable member or section 12, and the stationary swivel section 10, it being understood that the swivel section 12 if connected to a drill stem, may rotate, for instance, at from 60 to 100 r.p.m.

From the foregoing description and accompanying drawings, it will be seen that the invention provides a novel rotary swivel mechanism adapted for use for instance with a drill stem, and wherein the swivel is of a construction permitting and maintaining aligned rotation of a rotary swivel section with respect to a stationary swivel section, and permitting convenient adjustment and replacement of bearing means coacting between such sections.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A rotary swivel comprising a pair of cylindrical sleeve-like members including an outer rotary member and an inner stationary member disposed in generally telescoping relation, said outer member being adapted for rotary movement with respect to said inner member, said outer member on the interior thereof being recessed radially outwardly and said inner member on the exterior thereof being recessed radially inwardly in generally confronting relation to the recessed portion of said outer member, bearing means disposed in said recessed portions of said members for facilitating rotary movement of said outer member with respect to said inner member, said bearing means comprising upper and lower inner races and upper and lower outer races disposed in confronting relation to said inner races with upper and lower roller means disposed between and engaging the respective of said races, said races and roller means having tapered surfaces thereon adapted for disposal in engaging relation, a locking ring member coacting between said inner and outer members and with said outer races to hold the latter in predetermined position, and an adjustable nut threaded on said inner member and coacting with said inner races to hold the latter in predetermined position, said ring member at one end being disposed in supporting relation with said outer races and including in the direction of its other end a radially inwardly extending circumferential flange disposed below said nut and in sealing engagement with a smooth confronting interior surface of said inner member, said ring member being disposed in smooth sliding relation with the interior surface of said outer member for axial dropping removal in a downward direction away from said inner member, and adapter plate means coacting with said outer member and said ring member for holding said ring member in predetermined position, the last mentioned means being readily removable to permit axial removal of said ring member and said nut from said swivel for convenient access to said bearing means.

2. A rotary swivel in accordance with claim 1 wherein said ring member has sealing means mounted therein and coacting with said inner member for sealing in said bearing means.

3. A rotary swivel for use in rotary drilling or the like comprising, a pair of generally cylindrical sleeve-like members disposed in concentrically spaced and telescoping relationship with respect to one another and including an inner relatively stationary member and an outer member adapted for rotary movement with respect to said inner member, a bearing assembly disposed between said inner and outer members, said bearing assembly including a pair of upper spaced inner and outer races and a pair of spaced lower inner and outer races with roller bearing members disposed for coacting rolling engagement between each of said pairs of races, a selectively adjustable annular threaded nut member threadably connected to said inner member and adapted for bearing engagement against the inner race of said lower pair for pre-loading said bearing assembly, an annular locking ring member disposed in smooth confronting surface-to-surface engagement with said outer member, said locking ring member having an upper portion disposed in bearing and supporting engagement with the outer race of said lower pair for holding the respective outer races of both of said pairs in assembled relationship, the locking ring member including a radially inwardly extending circumferential flange disposed below said threaded nut member, the inner end of said flange mounting a sealing element thereon for sealing engagement with a smooth confronting interior surface of said inner member, and an annular adapter plate detachably mounted for rotational movement with said outer member and for coacting engagement with said locking ring member for holding the latter in said bearing and supporting engagement with the outer race of said lower pair.

4. A rotary swivel in accordance with claim 3, including a first sealing means coacting in sealing engagement between said locking ring member and the said smooth confronting interior surface of said inner member, and a second sealing means coacting in sealing engagement between said adapter plate member and the said smooth confronting interior surface of said inner member.

5. A rotary swivel in accordance with claim 4, wherein said first and second sealing means are disposed in axial alignment with respect to one another and below the radially extending flange of said locking ring member, and said second sealing means being disposed in a recess provided in said adapter plate member.

6. A rotary swivel in accordance with claim 3, including a locking element disposed between said nut member and the inner race of said lower pair for holding said nut member in a predetermined pre-loaded and locked position with respect to said bearing assembly.

7. A rotary swivel in accordance with claim 3, wherein said outer member includes an integral laterally outwardly projecting flange, and fastening means detachably connecting said adapter plate member to said laterally projecting flange.

8. A rotary swivel in accordance with claim 7, including a centrally apertured annular collar detachably connected to the outer surface of said adapter plate member for detachable coupling with a drill stem.

9. A rotary swivel in accordance with claim 3, including a lubricating opening extending through said outer member adapted for fluid lubricating communication with said bearing assembly.

10. A rotary swivel in accordance with claim 8, wherein said adapter plate member includes an upwardly facing recess therein and said outer member disposed in seated relation within said recess.

11. A rotary swivel in accordance with claim 8, wherein said collar has a centrally disposed upwardly facing recess therein, and an embossment on said adapter plate member received in said last mentioned recess.

References Cited

UNITED STATES PATENTS

| | | | |
|---|---|---|---|
| 2,356,351 | 8/1944 | Phillips | 285—276 X |
| 2,565,759 | 8/1951 | Danly et al. | 308—207 |
| 2,591,622 | 4/1952 | Shoup | 308—207 |
| 2,747,948 | 5/1956 | Jergens | 308—207 X |
| 2,839,007 | 6/1958 | Benedek | 308—207 X |
| 2,846,013 | 8/1958 | Davis | 285—276 X |
| 2,939,750 | 6/1960 | Weckstein | 308—236 |
| 3,204,707 | 9/1965 | Johnson | 173—57 |

FOREIGN PATENTS 597,182  1/1948  Great Britain.

FREDERICK L. MATTESON, Jr., *Primary Examiner.*
ROBERT A. DUA, *Assistant Examiner.*